(12) United States Patent
Hwang et al.

(10) Patent No.: US 8,921,003 B2
(45) Date of Patent: Dec. 30, 2014

(54) SOLID OXIDE FUEL CELL AND MANUFACTURING METHOD THEREOF

(75) Inventors: Chang-Sing Hwang, Taoyuan County (TW); Chun-Huang Tsai, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 109 days.

(21) Appl. No.: 13/540,764

(22) Filed: Jul. 3, 2012

(65) Prior Publication Data

US 2012/0269981 A1  Oct. 25, 2012

Related U.S. Application Data

(62) Division of application No. 12/483,765, filed on Jun. 12, 2009, now Pat. No. 8,241,812.

(30) Foreign Application Priority Data

Oct. 16, 2008 (TW) .............................. 097139656 A

(51) Int. Cl.
| | |
|---|---|
| H01M 4/48 | (2010.01) |
| H01M 8/12 | (2006.01) |
| H01M 4/86 | (2006.01) |
| H01M 4/88 | (2006.01) |

(52) U.S. Cl.
CPC .......... *H01M 8/1226* (2013.01); *H01M 4/8621* (2013.01); *H01M 4/8803* (2013.01); *H01M 4/8817* (2013.01); *H01M 4/886* (2013.01); *H01M 4/8896* (2013.01); *H01M 8/1213* (2013.01); *Y02E 60/522* (2013.01); *Y02E 60/525* (2013.01)

USPC .......................................... 429/488; 429/495

(58) Field of Classification Search
USPC .......................................................... 429/488
See application file for complete search history.

(56) References Cited

U.S. PATENT DOCUMENTS

| | | | |
|---|---|---|---|
| 6,013,386 | A | 1/2000 | Lewin et al. |
| 7,141,271 | B2 | 11/2006 | Barbezat et al. |
| 2003/0175573 | A1* | 9/2003 | Yoo et al. ......................... 429/34 |
| 2003/0207166 | A1 | 11/2003 | Hara et al. |
| 2004/0018409 | A1 | 1/2004 | Hui et al. |
| 2005/0019636 | A1* | 1/2005 | Kwon et al. ..................... 429/32 |
| 2006/0024547 | A1* | 2/2006 | Waldbillig et al. ............. 429/33 |

(Continued)

OTHER PUBLICATIONS

Liu et al. ("Nanostructured and functionally graded cathodes for intermediate temperature solid oxide fuel cells" Journal of Power Sources 138 (2004) 194-198).*

(Continued)

*Primary Examiner* — Ula C. Ruddock
*Assistant Examiner* — Jacob Marks
(74) *Attorney, Agent, or Firm* — WPAT, PC; Justin King

(57) ABSTRACT

A solid oxide fuel cell including a metal frame, a pre-treated porous metal substrate, an anode layer, an electrolyte layer, a cathode interlayer and a cathode current collecting layer is provided. The pre-treated porous metal substrate is disposed inside the metal frame. The anode layer is disposed on the porous metal substrate. The electrolyte layer is disposed on the anode layer. The cathode interlayer is disposed on the electrolyte layer. The cathode current collecting layer is disposed on the cathode interlayer. The anode layer is porous and nano-structured. Moreover, a manufacturing method of the solid oxide fuel cell mentioned above is also provided.

37 Claims, 8 Drawing Sheets

(56) References Cited

U.S. PATENT DOCUMENTS

| | | | |
|---|---|---|---|
| 2006/0063057 A1* | 3/2006 | Weil et al. | 429/34 |
| 2007/0009784 A1* | 1/2007 | Pal et al. | 429/45 |
| 2007/0037031 A1* | 2/2007 | Cassidy et al. | 429/32 |
| 2007/0072046 A1* | 3/2007 | Thompson et al. | 429/38 |
| 2007/0122674 A1* | 5/2007 | Horiuchi et al. | 429/32 |
| 2007/0178366 A1* | 8/2007 | Mahoney et al. | 429/44 |
| 2007/0237999 A1* | 10/2007 | Donahue et al. | 429/32 |
| 2007/0281194 A1* | 12/2007 | Cortright et al. | 429/26 |
| 2008/0131752 A1* | 6/2008 | Hwang | 429/34 |
| 2008/0149571 A1 | 6/2008 | Zeller et al. | |

OTHER PUBLICATIONS

Gell et al. ("Development and implementation of plasma sprayed nanostructured ceramic coatings" Surface and Coatings Technology 146-147 (2001) 48-54).*

* cited by examiner

SOLID OXIDE FUEL CELL AND MANUFACTURING METHOD THEREOF

CROSS REFERENCE TO RELATED PATENT APPLICATION

This Application is a Divisional of an Application Ser. No. 12/483,765, Filed on Jun. 12, 2009.

BACKGROUND OF THE INVENTION

1. Field of the Invention

The present invention generally relates to a solid oxide fuel cell and a manufacturing method thereof and, more particularly, to a solid oxide fuel cell comprising a nano-structured electrode with a metal support operating at intermediate temperature and a manufacturing method thereof.

2. Description of the Prior Art

The solid oxide fuel cell (SOFC) is an electrochemical power generation device, in which oxygen and hydrogen are used for power generation so as to achieve high power generation efficiency with low pollution. There are numerous reports on the electrolyte, the anode and the cathode of an solid oxide fuel cell, such as Appleby, "Fuel cell technology: Status and future prospects," *Energy*, 21, 521, 1996; Singhal, "Science and technology of solid-oxide fuel cells," *MRS Bulletin*, 25, 16, 2000; Williams, "Status of solid oxide fuel cell development and commercialization in the U.S.," Proceedings of 6th International Symposium on Solid Oxide Fuel Cells (SOFC VI), Honolulu, Hi., 3, 1999; and Hujismans et al., "Intermediate temperature SOFC—a promise for the 21th century," *J. Power Sources*, 71, 107, 1998). Generally, the electrolyte is made of yttria-stabilized zirconia (YSZ), the anode is made of a cermet (Ni/YSZ) composed of nickel and yttria-stabilized zirconia (YSZ), and the cathode is made of conductive lanthanum strontium-doped manganite (LSM, $LaMnO_3$) with a perovskite structure.

However, since yttria-stabilized zirconia (YSZ) exhibits sufficient ion conductivity only at high temperatures within a range from 900 to 1000° C., the solid oxide fuel cell made of high-cost materials is thus not widely used.

Therefore, in the prior art, a thinner yttria-stabilized zirconia (YSZ) electrolyte layer (about 5 µm) is provided to reduce the resistance and loss under the working temperature lowerer than 900° C. Alternatively, an electrolyte (made of, for example, lanthanum strontium gallate magnesite ($LaGaO_3$), LSGM) with high ion conductivity can be used to manufacture a solid oxide fuel cell that works at intermediate temperature (600 to 800° C.) with lower manufacturing cost. As the working temperature is reduced, the reliability and duration of the solid oxide fuel cell can be improved so that it is helpful to make the solid oxide fuel cell more acceptably used in home and car applications.

However, when the working temperature of the solid oxide fuel cell is lowered to about 600° C., a thinner yttria-stabilized zirconia (YSZ) electrolyte layer (about 5 µm) will not have enough ion conductivity to satisfy the low resistance loss requirement. Therefore, other electrolyte materials such as gadolinium doped ceria (GDC) or lanthanum strontium gallate magnesite (LSGM) with high ion conductivity are required Moreover, as the temperature decreases, electrochemical activities at the cathode and anode decrease, and polarization resistances at the cathode and anode increase with a larger energy loss. Therefore, new materials for the cathode (such as lanthanum strontium cobalt ferrite (LSCF, $La_{0.6}Sr_{0.4}Co_{0.2}Fe_{0.8}O_3$)) and the anode (such as a mixture (GDC/Ni) composed of nickel and gadolinium doped ceria (GDC) or a mixture (LDC/Ni) composed of nickel and lanthanum doped ceria (LDC)) are required. Moreover, in the prior art, the cathode and the anode are mostly micron-structured, which should be improved to be nano-structured so as to increase the number of tri-phase boundaries (TPB) to improve the electrochemical activities at the cathode and the anode to reduce energy loss.

For the anode structure, in Virkar's "Low-temperature anode-supported high power density solid oxide fuel cells with nano-structured electrodes," Fuel Cell Annual Report, 111, 2003, a Ni/YSZ cermet as the anode of a solid oxide fuel cell is disclosed with a thin layer of smaller pores and a thick layer of larger pores. The diameters of the smaller pores should be as small as possible to increase the number of tri-phase boundaries (TPB). However, Virkar fails to disclose how to manufacture the thin layer with nano structure in that report.

Moreover, Wang also discloses, in "Influence of size of NiO on the electrochemical properties for SOFC anode," *Chemical Journal of Chinese Universities*, a mixture of nano NiO and micron YSZ is press-formed and reduced by hydrogen to obtain a cermet anode with increased tri-phase boundaries (TPB) and reduced electrode energy loss. However, Wang also fails to disclose how to make a nano-structured anode in that paper.

For the cathode structure, in Liu's "Nano-structured and functionally graded cathodes for intermediate temperature solid oxide fuel cells," *J. Power Sources*, 138, 194, 2004, a nano and functionally graded structured cathode is manufactured by combustion chemical vapor-phase deposition. Since the number of electrochemical reaction sites or tri-phase boundaries (TPB) at the cathode is increased, the polarization and ohmic resistances are lowered to reduce the energy loss.

For the electrolyte, as the electrolyte thickness increases, the internal resistance of the solid oxide fuel cell increases to cause larger energy loss and smaller output power. More particularly, when the working temperature of the solid oxide fuel cell is below 700° C., the energy loss due to electrolyte resistance becomes dominant. Therefore, the electrolyte thickness has to be reduced or the ion conductivity in the electrolyte has to be enhanced so as to improve the output power delivered by the cell.

Generally, the solid oxide fuel cell can be manufactured by (1) chemical vapor-phase deposition (CVD) (2) electrochemical vapor-phase deposition (3) sol-gel (4) strip casting (5) silk screen printing (6) physical vapor-phase deposition (7) spin coating and (8) plasma spray. There are two methods to perform plasma spray: atmospheric plasma spray and vacuum plasma spray. In the above manufacturing methods, strip casting, silk screen printing and spin coating require plural high-temperature sintering processes, while chemical vapor-phase deposition (CVD), electrochemical vapor-phase deposition, sol-gel, physical vapor-phase deposition and plasma spray can be used to manufacture the solid oxide fuel cell without high-temperature sintering processes.

In the manufacturing methods requiring high-temperature sintering processes, it often leads to warping and cracks in the components of the solid oxide fuel cell during high-temperature sintering.

Moreover, high-temperature sintering is often used to obtain the dense electrolyte layer and improve the contact between the electrolyte layer and the electrode layer, but it also causes the porous electrode layer to become denser and less mass transfer. Moreover, high-temperature sintering process often results in chemical reactions between the electrolyte layer and the electrode layer, those reactions are often unfavorable to the cell performances and occur. For example, the lanthanum strontium gallate magnesite (LSGM) electrolyte layer reacts at high temperatures with nickel in the anode layer to produce an insulating lanthanum nickel oxide ($LaNiO_3$) layer and to increase the internal resistance of the solid oxide fuel cell. (See Zhang et al., "Interface reactions in the NiO-SDC-LSGM system," *Solid State Ionics*, 139, 145, 2001). Furthermore, high-temperature sintering causes the nano-particles in the anode, the cathode and the electrolyte to aggregate and grow into sub-micron particle or micron-particles.

U.S. Patent Appl. No. 2007/0009784 discloses an intermediate temperature solid oxide fuel cell manufactured by high-temperature sintering. The anode is formed of a mixture (LDC/Ni) composed of nickel and lanthanum doped ceria (LDC, $La_{0.4}Ce_{0.6}O_2$); the electrolyte is formed of lanthanum strontium gallate magnesite (LSGM); and the cathode is formed of an interlayer comprised of lanthanum strontium gallate magnesite (LSGM) and lanthanum strontium cobalt ferrite (LSCF) with 50%:50% volumetric ratio and a current collecting layer comprised of lanthanum strontium cobalt ferrite (LSCF).

In order to prevent lanthanum strontium gallate magnesite (LSGM) electrolyte from reacting with nickel particles in the anode layer to produce insulating lanthanum nickel oxide ($LaNiO_3$) at high temperatures such as 1200 to 1300° C. for sintering anode and 1100° C. for sintering cathode, an isolation layer formed of lanthanum doped ceria (LDC) is added between the anode and the electrolyte.

However, when the thickness of lanthanum strontium gallate magnesite (LSGM) electrolyte is smaller than 20 μm, cobalt (Co) particles in lanthanum strontium cobalt ferrite (LSCF) cathode diffuse into the lanthanum strontium gallate magnesite (LSGM) electrolyte at high temperatures to worsen the electron insulation of this electrolyte and cause electron transport and internal leakage in the solid oxide fuel cell. As a result, the open-circuit voltage is smaller than 1 volt. In other words, it is inevitable that the manufacturing methods requiring high-temperature sintering are problematic of element diffusions and reactions at high temperatures.

Among the manufacturing methods without high-temperature sintering, the atmospheric plasma spray is very potential and has attracted lots of attention. More particularly, the plasma flame of atmospheric plasma spray is capable of heating up the injected powders to be melted or semi-melted. The melted or semi-melted powders are cooled down and turned into a film instantly after they bombard the substrate. In this method, chemical reactions (for example, to produce insulating lanthanum nickel oxide ($LaNiO_3$)) that are unfavorable to the cell performances can be avoided, as disclosed in Hui et al., "Thermal plasma spraying for SOFCs: Applications, potential advantages, and challenges," *J. Power Sources*, 170, 308, 2007.

U.S. Pat. No. 7,141,271 discloses a vacuum plasma spray method for producing a solid oxide fuel cell, wherein a solid electrolyte layer deposited on an electrode inside a coating chamber at a vacuum less than 15 mbar is gas-tight. The powders injected into the plasma spray gun are micron powders smaller than 10 μm. However, the vacuum plasma spray is more complicated, expensive and less efficient in mass production.

Moreover, U.S. Patent Appl. No. 2004/0018409 discloses a solid oxide fuel cell manufactured by dual-gas atmospheric plasma spray with low voltage (lower than 70V) and high current (larger than 700 A). In this patent, when the thickness of the lanthanum strontium gallate magnesite (LSGM) electrolyte is larger than 60 μm, the open-circuit voltage (OCV) is larger than 1V. Since the plasma arc root at the anode nozzle of plasma spray gun moves with the plasma gas stream to cause voltage variation ΔV of the plasma spray gun. Therefore, the atmospheric plasma spray with a gun working at low voltage and large current exhibits a relatively large voltage variation ratio ΔV/V which leads to an unstable powder heating and an unreliable coating.

Moreover, in the low-voltage high-current dual-gas atmospheric plasma spray, the shorter plasma arc leads to a shorter heating time and a poorer thermal heating efficiency of powders. Moreover, the high current results in the serious erosions of cathode and anode electrodes of atmospheric plasma spray gun. The cathode and the anode are updated more frequently and the cost of manufacturing solid oxide fuel cells increases.

In U.S. Patent Appl. No. 2004/0018409, the micron powder clusters for plasma spray are formed by aggregating powders smaller than 100 nm with a polyvinyl alcohol (PVA) binder. The PVA binder is then removed by conventional heating processes to acquire sintered porous nano-structured micron powder clusters. These nano-structured micron powder clusters formed by complicated processes in this patent increase the cost of manufacturing the solid oxide fuel cell. Moreover, to increase the surfaces of these micron powder clusters for heating by plasma flame, these powder clusters are often formed in a hollow structure that costs more.

SUMMARY OF THE INVENTION

It is an object of the present invention to provide a solid oxide fuel cell with excellent electric characteristics and high thermal conductivity by using a metal support.

It is another object of the present invention to provide a manufacturing method of a solid oxide fuel cell using tri-gas atmospheric plasma spray with medium current and high voltage of spray gun to improve thin film quality and efficiency.

In order to achieve the foregoing or other objects, the present invention provides a solid oxide fuel cell comprising a metal frame, a porous metal substrate, an anode layer, an electrolyte layer, a cathode interlayer and a cathode current collecting layer. The porous metal substrate is disposed inside the metal frame. The anode layer is disposed on the porous metal substrate. The electrolyte layer is disposed on the anode layer. The cathode interlayer is disposed on the electrolyte layer. The cathode current collecting layer is disposed on the cathode interlayer. Moreover, the anode layer is ventilatively porous and nano-structured. The electrolyte layer is dense enough to achieve gas-tightness. The cathode interlayer is ventilatively porous and nano-structured. The cathode current collecting layer is ventilatively porous and sub-micron or micron structured.

More particularly, the anode layer comprises a plurality of anode electron-conducting nano-particles and a plurality of anode ion-conducting nano-particles arranged to form a plurality of anode nano-pores between the anode electron-conducting nano-particles and the anode ion-conducting nano-particles, and the cathode interlayer comprises a plurality of cathode electron-conducting particles and a plurality of cathode ion-conducting nano-particles arranged to form a plurality of cathode pores between the cathode electron-conducting particles and the cathode ion-conducting nano-particles.

In order to achieve the foregoing or other objects, the present invention further provides a manufacturing method of a solid oxide fuel cell, comprising steps of: performing a preliminary treatment on a porous metal substrate; and forming in order on the porous metal substrate an anode layer, an electrolyte layer, a cathode interlayer and a cathode current collecting layer; wherein at least one of the anode layer, the electrolyte layer, the cathode interlayer and the cathode current collecting layer is formed by a medium current and high voltage tri-gas atmospheric plasma spraying process.

In the present invention, the supporting structure of the solid oxide fuel cell is composed of a porous metal substrate and a metal frame so as to increase resistance to cell deformation at high temperatures, cell flatness, cell mechanical strength, supporting strength for cell stack manufacture and thermal conductivity of cell and stack. Moreover, the anode layer and the cathode interlayer of the solid oxide fuel cell are formed of a composite nano-structure comprising nano-particles. Therefore, The electrochemical reaction activities and conductivities of anode and cathode electrodes can be improved with lowered electrode resistances to reduce power consumption. Moreover, the lifetime of the electrode structure is lengthened because the aggregation of each component at high temperatures in the well mixed and nano-structured electrode is prohibited by other component.

To overcome the short lifetime problem of spray gun electrodes operated at low voltage (under 70V) and high current (over 700A) in the conventional dual-gas atmospheric plasma spray process, the present invention provides a medium current and high voltage tri-gas atmospheric plasma spray process capable of operating at high voltage (86-106V) and medium current (under 520 A). Since the working current is smaller, the erosion rates and lifetimes of the cathode and anode of plasma spray gun can be lengthened to reduce cost. Moreover, the plasma gun operated in the medium current and high voltage tri-gas atmospheric plasma spray process exhibits a longer plasma arc to increase the heating time of injected powders and enable the powders to be heated efficiently.

Moreover, in the present invention, nano-structured micron powder clusters formed by aggregating nano powders with diameter smaller than 100 nm with a polyvinyl alcohol (PVA) binder are injected into the plasma flame of the medium current and high voltage tri-gas atmospheric plasma spray (APS). The plasma flame removes the polyvinyl alcohol (PVA) binder and heats up the remained nano powders. In the plasma flame, since nano powders exhibit a larger surface area, it helps the nano powders to be heated up uniformly to be melted or semi-melted. The manufactured nano-structured layer does not only provide better functionality due to the nano structure, but also reduce the amount of powders for atmospheric plasma spray and thus the cost for manufacturing the solid oxide fuel cell can be also reduced.

Moreover, atmospheric plasma spray is a rapid sintering process, in which the average surface temperatures of coated substrates are kept at temperatures lower than 900° C. and the temperatures of post heat treatment after the spray coating are performed at temperatures lower than 950° C., hence the problems due to the chemical reaction of lanthanum strontium gallate magnesite (LSGM) with nickel and cobalt diffusion into the lanthanum strontium gallate magnesite (LSGM) electrolyte that occur in the conventional high-temperature sintering process can be avoided.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention can be exemplified but not limited by the embodiments as described hereinafter.

Figure 1:
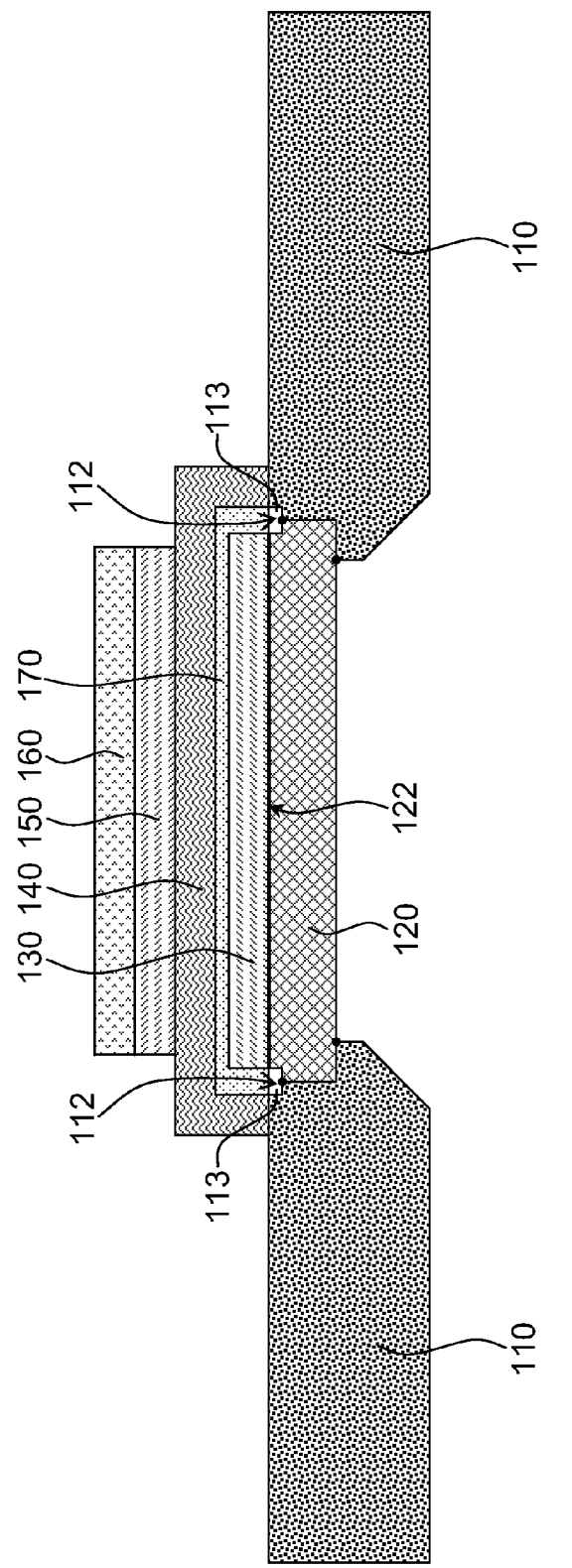
FIG. 1 is a cross-sectional view of a solid oxide fuel cell according to one embodiment of the present invention.

FIG. 1 is a cross-sectional view of a solid oxide fuel cell according to one embodiment of the present invention. Referring to FIG. 1, the solid oxide fuel cell 100 in the present invention comprises a metal frame 110, a pre-treated porous metal substrate 120, an anode layer 130, an electrolyte layer 140, a cathode interlayer 150 and a cathode current collecting layer 160. The pre-treated porous metal substrate 120 is welded to the metal frame 110. On the pre-treated porous metal substrate 120, the anode layer 130, the electrolyte layer 140, the cathode interlayer 150 and the cathode current collecting layer 160 are formed in order. Moreover, the isolation layer 170 for preventing reaction between the electrolyte and the anode can be added in the coating process after coating the anode layer 130, and the anode layer 130 can be porous and nano-structured, and the cathode interlayer 150 can also be porous and nano-structured.

Figure 2B:
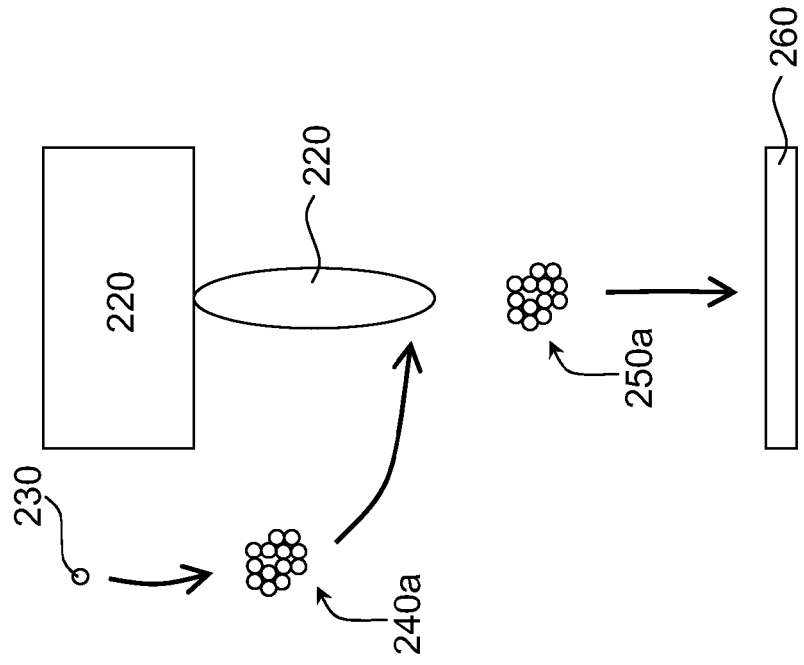
FIG. 2A and FIG. 2B show a comparison of film formation by atmospheric plasma spray in the present invention and in the prior art.
Figure 2A:
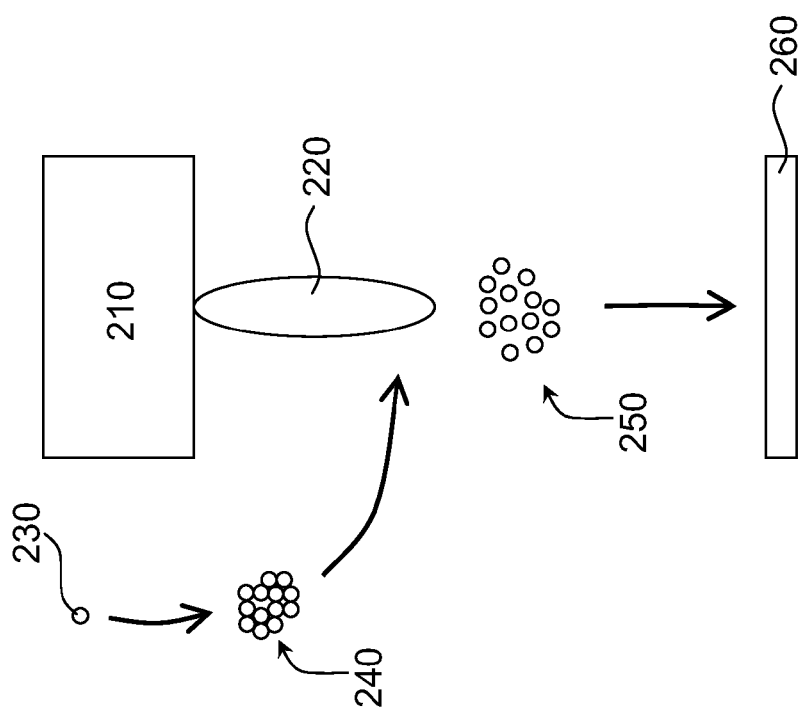

More particularly, the anode layer 130 and the cathode interlayer 150 are formed to be nano-structured by the medium current and high voltage tri-gas atmospheric plasma spray. Referring to FIG. 2A and FIG. 2B for a comparison of film formation by the medium current and high voltage tri-gas atmospheric plasma spray in the present invention and in the prior art (U.S. Patent Appl. No. 2004/0018409), respectively. A plasma spray gun 210 generates a plasma flame 220 to deposit powder clusters onto a substrate 260 to form a thin film. In the present invention, nano powders 230 with diameters smaller than 100 nm are aggregated by a polyvinyl alcohol (PVA) binder to form nano-structured micron powder clusters 240. The powder clusters 240 are then injected into the plasma flame 220 generated by the medium current and high voltage tri-gas atmospheric plasma spray (APS) to remove the polyvinyl alcohol (PVA) binder by the plasma flame 220 and heat up the nano powders 250.

As the polyvinyl alcohol (PVA) binder is removed by the plasma flame 220, the micron cluster of nano powders 240 will be transformed into separated nano powders 250 due to the removal of the PVA binder. As a result, nano powders 250 will have a larger surface area as a whole so that the plasma flame 220 can uniformly heat up the nano powders 250 to be melted or semi-melted to form a thin film on the substrate

260. The manufactured nano-structured layer provides better functionality due to the nano structure with more tri-phase boundaries (TPB).

However, in FIG. 2B, in the prior art, nano powders 230 with diameters smaller than 100 nm are added to a polyvinyl alcohol (PVA) binder to form nano-structured micron powder clusters 240. The powder clusters 240 are then heated up by the conventional thermal process to remove the PVA binder to form sintered porous nano-structured micron powder clusters 240*a*. Then, the powder clusters 240*a* injected into a plasma flame 220 generated by the conventional atmospheric plasma spray (APS) are heated up into melted or semi-melted nano powder clusters 250*a* to form a thin film on the substrate 260.

Since the nano-structured micron powder clusters 240*a* have experienced the conventional thermal process, the nano powder clusters 240*a* and 250*a* are aggregated so tightly to decrease the surface area of powders to be heated by plasma flame 220. Therefore, the plasma flame 220 is not able to uniformly and efficiently heat up the nano powder clusters 240*a* and 250*a*. As a result, the thin film as formed exhibits poor quality. Moreover, in the prior art, the conventional thermal process used to remove the PVA binder results in increased manufacturing cost.

Figure 3:
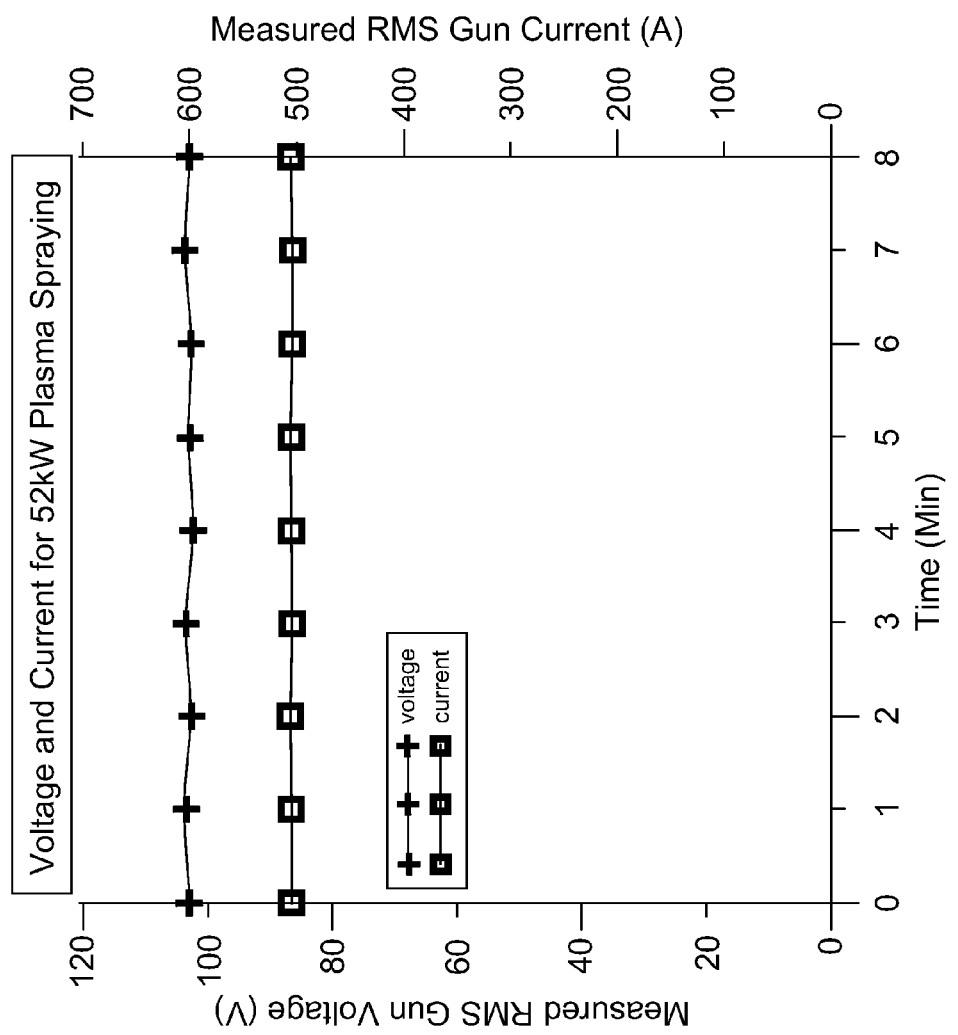
FIG. 3 shows high voltage and medium current curves for a 52-kW atmospheric plasma spray.

Moreover, the anode layer 130 and the cathode interlayer 150 in the present invention can be formed to be nano-structured by conventional dual-gas atmospheric plasma spray or the invented medium current and high voltage tri-gas atmospheric plasma spray. Compared to conventional dual-gas atmospheric plasma spray, the plasma flame generated by the medium current and high voltage tri-gas atmospheric plasma spray in the present invention exhibits the voltage and current characteristics as shown in FIG. 3 and has a longer plasma arc and then the longer plasma flame to lengthen the time for heating powders so that the powders are heated up more efficiently to be deposited to form a thin film with better quality. More particularly, the thin film as formed exhibits more tri-phase boundaries (TPB) and stronger mechanical strength.

In the present embodiment, the anode layer 130 comprises a mixture of anode electron-conducting nano-particles and anode ion-conducting nano-particles. The anode electron-conducting nano-particles comprise nano nickel, nano copper, nano nickel-copper or nano nickel-copper-cobalt. The anode ion-conducting nano-particles comprise nano yttria-stabilized zirconia (YSZ), nano lanthanum doped ceria (LDC) or nano gadolinium doped ceria (GDC). In other words, the anode layer 130 comprises a mixture (YSZ/Ni) of nano nickel and nano yttria-stabilized zirconia (YSZ), a mixture (LDC/Ni) of nano nickel and nano lanthanum doped ceria (LDC) or a mixture (GDC/Ni) of nano nickel and nano gadolinium doped ceria (GDC).

As stated above, the anode layer 130 exhibits a plurality of nano tri-phase boundaries (TPB) composed of three nano structures, these are nano pores, electron-conducting nano particles and ion-conducting nano particles. The ion-conducting nano particles can be the nano yttria-stabilized zirconia (YSZ) powders, the nano lanthanum doped ceria (LDC) powders, the nanogadolinium doped ceria (GDC) powders or other ion-conducting nano powders, and the electron-conducting nano particles can be the nano nickel (Ni) powders, nano copper (Cu) powders, nano nickel-copper (Ni/Cu) powders, nano nickel-copper-cobalt (Ni/Cu/Co) powders or other electron-conducting nano powders, and the nano pores are formed between electron-conducting nano particles and ion-conducting nano particles These nano tri-phase boundaries (TPB) can effectively enhance the electrochemical reaction activity and conductivity of the anode layer 130 and reduce the resistance of the anode layer 130 and hence the energy loss. Moreover, due to the intermixing of nano metal particles with nano ceramic particles, the problem of nano metal particle or nano ceramic particle aggregation at high temperatures can be avoided so as to lengthen the duration of the anode layer 130. Moreover, the sizes of the anode electron-conducting nano-particles, the anode ion-conducting nano-particles or the anode nano-pores are smaller than 100 nm, alternatively, 50 nm or 25 nm. The present invention is not limited to the size of these elements.

Moreover, the anode layer can be a two-layer structure made of two porous sublayers. The first porous sublayer has the same material and structure as stated above, the second porous layer, for example lanthanum chromite layer, has the capabilities to conduct electrons and to prohibit anode poison elements such as chromium to diffuse into the first porous layer from the porous metal substrate 120. The second porous layer has the same porosity and thickness as the first porous layer.

Similarly, in the present embodiment, the cathode interlayer 150 comprises a mixture of cathode electron-conducting particles and cathode ion-conducting nano-particles. A plurality of cathode pores are formed between the cathode electron-conducting particles and the cathode ion-conducting nano-particles. The cathode electron-conducting particles can be nano, sub-micron or micron structured, to which the present invention is not limited. Therefore, the cathode pores as formed are nano, sub-micron or micron structured. More particularly, the cathode electron-conducting particles comprise lanthanum strontium cobalt ferrite (LSCF), lanthanum strontium ferrite (LSF), lanthanum strontium cobaltite (LSCo) or samarium strontium cobalt oxide (SSC), and the cathode ion-conducting nano-particles comprise nano lanthanum strontium gallate magnesite (LSGM), nano gadolinium doped ceria (GDC), nano lanthanum doped ceria (LDC) or the like. LSCF, LSCo, LSF and SSC can also conduct negative oxygen ion, so they are both electron and ion conductors.

In other words, the cathode interlayer 150 comprises, for example, a mixture (LSGM/LSCF) of nano lanthanum strontium gallate magnesite (LSGM) and lanthanum strontium cobalt ferrite (LSCF), a mixture (GDC/LSCF) of nano gadolinium doped ceria (GDC) and lanthanum strontium cobalt ferrite (LSCF) or a mixture (LDC/LSCF) of nano lanthanum doped ceria (LDC) and lanthanum strontium cobalt ferrite (LSCF). Similarly, the cathode interlayer 150 exhibits a plurality of nano tri-phase boundaries (TPB) with better electrochemical reaction activity and conductivity. The LSCF can be replaced by other cathode materials mentioned above.

Moreover, in the nano-structured cathode interlayer 150, the sizes of the cathode electron-conducting particles, the cathode ion-conducting nano-particles or the cathode pores are smaller than 100 nm, alternatively, 50 nm or 25 nm. Certainly, if the cathode electron-conducting particles are sub-micron scaled, the size of the cathode electron-conducting particles can be smaller than 400 nm, to which the present invention is not limited.

In the anode layer 130 and the cathode interlayer 150, the thickness of the anode layer 130 is within a range from 10 to 30 μm, preferably within a range from 15 to 25 μm. The porosity of the anode layer 130 is within a range from 15 to 30%. The thickness of the cathode interlayer 150 is within a range from 15 to 40 μm, preferably within a range from 20 to 30 μm. The porosity of the cathode interlayer 150 is within a range from 15 to 30%. The anode layer 130 and the cathode interlayer 150 can be gradedly structured to eliminate the effect of differences of their thermal expansion coefficients with the electrolyte layer 140.

Moreover, the cathode interlayer 150 can be formed of a single-layered electron-ion mixed conducting material or a composite material comprising the material of the electrolyte layer 140 and the electron-ion mixed conducting material with a gradedly volumetric ratio or 50%:50% volumetric ratio.

Referring to FIG. 1, the porous metal substrate 120 of the present invention allows the reactive gas to pass through. However, such a porous structure weakens the mechanical strength of the porous metal substrate 120. Therefore, in the present invention, a metal frame 110 is provided to support the porous metal substrate 120 and enhance the structural strength of the solid oxide fuel cell 100.

In the present embodiment, the porous metal substrate 120 comprises a porous metal sheet comprising nickel, iron, copper or a mix of them. More particularly, the porous metal sheet comprises undoped nickel powders, nickel powders doped with iron powders, copper powders doped with iron powders or copper powders and nickel powders doped with iron powders. The weight percentage of the iron powders is smaller than 20%. The anode poison elements such as chromium in the porous metal substrate should be as small as possible. Moreover, the porosity of the porous metal substrate 120 is within a range from 25 to 45%, the thickness of the porous metal substrate 120 is within a range from 0.6 to 2 mm, and the area of the porous metal substrate 120 is within a range from 2.5×2.5 cm$^2$ to 20×20 cm$^2$, to which the present invention is not limited.

Moreover, the anode layer 130 is deposited on the porous metal substrate 120. When the diameters of the surface pores on the porous metal substrate 120 are larger than 50 μm, it is difficult to deposit the anode layers without large pinhole defects. Therefore, in the present invention, a layer 122 formed of sintered powders is applied on the porous metal substrate 120 so that the diameters of the surface pores on the porous metal substrate 120 are smaller than 50 μm. The powders used to form layer 122 can be metal powders or any kind of anode powders.

The metal frame 110 comprises anti-oxidation and anti-corrosion stainless steel such as ferritic stainless steel, or other metal materials with high temperature resistance, anti-oxidation and anti-corrosion such as Crofer 22. The thickness of the metal frame 110 is with a range from 1 to 3 mm and the coefficient of thermal expansion is within a range from 9 to 14×10$^{-6}$/° C. so as to match the electrolyte layer as possible.

It is noted that even though the metal frame 110 of the present embodiment does not directly contact the cathode interlayer 150 and the cathode current collecting layer 160, a protection layer (not shown) can be coated on the metal frame 110 to prevent chromium pollution on the cathode interlayer 150 and the cathode current collecting layer 160. The protection layer comprises manganese-cobalt spinel or manganese-chromium spinel or lanthanum strontium-doped manganite (LSM).

In the present embodiment, the metal frame 110 and the porous metal substrate 120 are connected by laser welding with welding points labeled by small points in FIG. 1. However, the present invention is not limited to how the porous metal substrate 120 and the metal frame 110 are connected. Because of the high integrity, high resistance to deformation, high mechanical strength of the solid oxide fuel cell 100 and the high alignment capability of the metal frame 110, a plurality of solid oxide fuel cells 100 can be stacked as a cell stack. Moreover, a groove 112 can be provided at the joint of the metal frame 110 and the porous metal substrate 120 to be filled with a sealent 113 to prevent oxygen gas above the cathode current collecting layer 160 and fuel gas below the porous metal substrate 120 from communicating. The sealent 113 comprises a high temperature resistant glass or a glass-ceramic composite material, or other material can be brazed.

Referring to FIG. 1, the electrolyte layer 140 can be single-layered, double-layered or multi-layered. A single-layered electrolyte layer 140 may comprise lanthanum strontium gallate magnesite (LSGM), lanthanum doped ceria (LDC) or gadolinium doped ceria (GDC). A double-layered electrolyte layer 140 may comprise negative oxygen ion-conducting materials such as lanthanum doped ceria-lanthanum strontium gallate magnesite (LDC-LSGM) or gadolinium doped ceria-lanthanum strontium gallate magnesite (GDC-LSGM). A tri-layered or multi-layered electrolyte layer 140 may comprise lanthanum doped ceria-lanthanum strontium gallate magnesite-lanthanum doped ceria (LDC-LSGM-LDC) or lanthanum doped ceria-lanthanum strontium gallate magnesite-gadolinium doped ceria (LDC-LSGM-GDC).

As stated above, the order and thickness of these layers can be decided according to practical use. In the present embodiment, the thicknesses of lanthanum doped ceria (LDC) and gadolinium doped ceria (GDC) are within a range from 10 to 20 μm, and the thickness of lanthanum strontium gallate magnesite (LSGM) is within a range from 25 to 45 μm. Moreover, lanthanum doped ceria (LDC) and gadolinium doped ceria (GDC) are disposed between lanthanum strontium gallate magnesite (LSGM) and the anode layer 130 to prevent producing high resistance oxides such as lanthanum nickel oxide when the solid oxide fuel cell 100 operates at high temperatures larger than 700° C. LDC and GDC can also be disposed between lanthanum strontium gallate magnesite (LSGM) and the cathode interlayer 150 to prevent cobalt in the cathode interlayer 150 from diffusing into the electrolyte layer 140.

It is noted that, as the solid oxide fuel cell 100 can be operated at a temperature over 700° C., an isolation layer 170 can be disposed between the anode layer 130 and the electrolyte layer 140 so as to avoid interface interaction defects due to long-time operation of the solid oxide fuel cell 100. In other words, the isolation layer 170 such as lanthanum doped ceria (LDC), yttria doped ceria (YDC) or gadolinium doped ceria (GDC) is applied to prevent the electrolyte layer from reacting with the anode layer 130.

Referring to FIG. 1, the cathode current collecting layer 160 is for collecting the current from the cathode interlayer 150. Relatively, the porous metal substrate 120 is for collecting the current from the anode. The cathode current collecting layer 160 can be sub-micron or micron structured and comprise sub-micron or micron lanthanum strontium cobalt ferrite (LSCF) powders, sub-micron or micron lanthanum strontium cobaltite (LSCo) powders, sub-micron or micron lanthanum strontium ferrite (LSF) powders or samarium strontium cobalt oxide (SSC) powders. In the present embodiment, the thickness of the cathode current collecting layer 160 is within a range from 20 to 50 μm, preferably within a range from 30 to 40 μm. The porosity of the cathode current collecting layer 160 is within a range from 25 to 45%. The diameters of the powders in the cathode current collecting layer 160 can be within a range from 0.4 to 6 μm. Moreover, the cathode current collecting layer 160 may comprise an electron-ion mixed conducting material. However, the present invention is not limited to the material, the powder sizes, the thickness or the porosity of the cathode current collecting layer 160.

It is noted that the present invention is not limited to whether the cathode current collecting layer 160 is porous sub-micron or micron structured. For example, nano catalysis metal can be impregnated into the porous sub-micron or micron structured cathode current collecting layer 160 using impregnation and percolation so as to turn the porous submicron or micron structured cathode current collecting layer 160 into porous and nano-structured cathode current collecting layer 160. The nano catalysis metal can be nano silver, nano palladium or other that can increase the capability of adsorbing oxygen molecules and dissociating them into oxygen atoms.

The structure of the solid oxide fuel cell 100 of the present invention has been described in detail. The manufacturing method of the solid oxide fuel cell 100 will be described with reference to the flowcharts in accompanying drawings, especially for the medium current and high voltage tri-gas atmospheric plasma spraying process according to the present invention.

Figure 4:
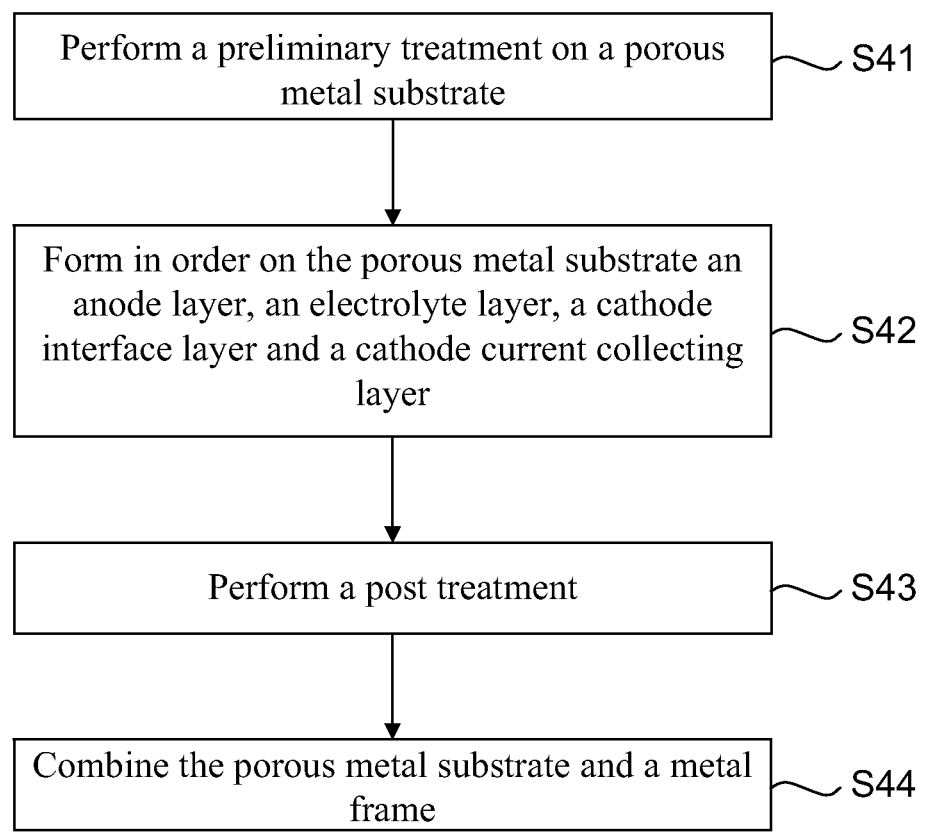
FIG. 4 is a flowchart of a manufacturing method of a solid oxide fuel cell according to one embodiment of the present invention.

FIG. 4 is the flowchart of a manufacturing method of a solid oxide fuel cell according to one embodiment of the present invention. Referring to FIG. 4, the manufacturing method of a solid oxide fuel cell according to the present invention comprises steps S41 and S42, and preferably steps S43 and S44. First, in the step S41, a preliminary treatment is performed on a porous metal substrate 120. This preliminary treatment includes a high temperature and high pressure sintering process to increase the thermal stability of strength of porous metal substrate and to coat a porous layer 122 on the top of porous metal substrate. Then, in step S42, an anode layer 130, an electrolyte layer 140, a cathode interlayer 150 and a cathode current collecting layer 160 are formed in order on the porous metal substrate 120 (as shown in FIG. 1). At least one of the anode layer 130, the electrolyte layer 140, the cathode interlayer 150 and the cathode current collecting layer 160 is formed by the medium current and high voltage tri-gas atmospheric plasma spray process disclosed in the present invention. Thereby, the solid oxide fuel cell 100 of the present invention is formed. However, in a preferred embodiment of the present invention, the anode layer 130, the electrolyte layer 140, the cathode interlayer 150 and the cathode current collecting layer 160 are all manufactured by the medium current and high voltage tri-gas atmospheric plasma spray process disclosed in the present invention.

For better quality, after the cathode current collecting layer 160 is formed, a post treatment in step S43 is performed in the present embodiment. The post treatment is performed to improve the performances and reliability of the solid oxide fuel cell 100. Moreover, in FIG. 4, after the post treatment (step S43), step S44 is performed to combine the porous metal substrate 120 and the metal frame 110. However, in other embodiments, the porous metal substrate 120 and the metal frame 110 can be combined right after the preliminary treatment (step S41). Then, the multiple layers are formed (step S42), and finally the post treatment is performed (step S43). However, the present invention is not limited to the order of the foregoing steps.

Moreover, in the present invention, the porous metal substrate 120 and the metal frame 110 can be combined right after the porous metal substrate 120 is coated with thin films. Alternatively, in other embodiments, the porous metal substrate 120 and the metal frame 110 can be combined after the cathode current collecting layer 150 is formed. Moreover, the porous metal substrate 120 and the metal frame 110 can also be combined during the formation of the anode layer 120, the electrolyte layer 130, the cathode interlayer 140 and the cathode current collecting layer 150. However, the present invention is not limited to the order of the foregoing steps.

Figure 5:
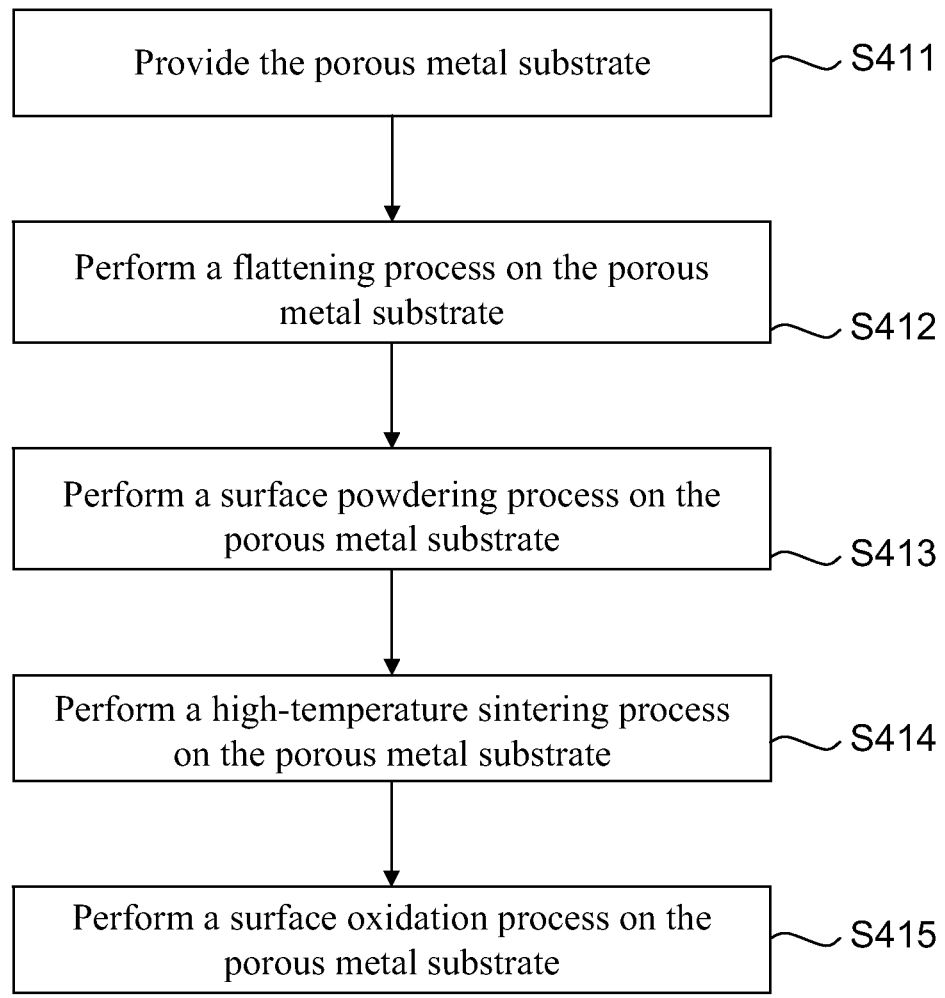
FIG. 5 is a flowchart of a preliminary treatment according to one embodiment of the present invention.

The porous metal substrate preliminary treatment process will be described in detail hereinafter. FIG. 5 is a flowchart of a preliminary treatment according to one embodiment of the present invention. Referring to FIG. 5, in steps S411 to S415, a porous metal substrate 120 is provided and then a flattening process, a surface powder pasting process, a high temperature and high pressure sintering process and a surface oxidation process are performed in order on the porous metal substrate 120.

Similarly, the porous metal substrate 120 can be a porous nickel metal sheet with a thickness within a range from 0.6 to 2 mm and an area within a range from 5 cm×5 cm$^2$ to 15 cm×15 cm$^2$. However, the present invention is not limited to the material, the structure or the shape of the porous metal substrate 120. Then, the flattening process is performed on the porous metal substrate 120 to flatten the surface of the porous metal substrate 120. However, if the porous metal substrate 120 is flat enough, S412 can be omitted.

Then, the porous metal substrate 120 is coated with a powder slurry. The surplus powder slurry on the porous metal sheet 120 is scraped off by a scraper after the metal powder slurry is dried. Thereby, the surface powder pasting process is completed. The powder slurry comprises nickel powder slurry, metal powder slurry comprising nickel, iron, copper, or anode powder slurry such as YSZ/NiO, LDC/NiO or GDC/NiO slurry etc. The anode poison elements such as chromium in the powder slurry should be as small as possible After the surface powder pasting process, the high temperature and high pressure (up to 50 kg/cm$^2$) sintering process is performed by heating up to 1200° C. for sintering for 1 to 2 hours in a reducing atmosphere (7% hydrogen and 93% argon) and then cooling down to room temperature. As a result, a thin porous layer 122 can be formed on the porous metal substrate 120. The diameters of the surface pores of this porous layer 122 are less than 50 μm, which is helpful for later filming processing. The present invention is not limited to the thickness of this porous layer 122, the temperature and the pressure to sinter this layer.

In step S415, the surface oxidation process is then performed on the coated porous metal substrate 120 after completing the layer 122 so that the diameters of the surface pores of the layer 122 can be further reduced. More particularly, the surface oxidation process is performed for 15 to 45 minutes at a high temperature within a range from 700 to 800° C. in an atmospheric environment so as to reduce the diameters of the surface pores to smaller than 30 μm. The surface oxidation process (step S415) can be omitted if the diameters of the surface pores are reduced to smaller than 30 μm after finishing the surface powder pasting process (step S413) and the high temperature and high pressure sintering process (step S414) in FIG. 5.

After completing the preliminary treatment in FIG. 5, the porous metal substrate 120 and the metal frame 110 can be welded together. However, in the present embodiment, as shown in FIG. 4, the coated porous metal substrate 120 and the metal frame 110 are welded together after the multiple layers are formed (step S42) and the post treatment is performed (step S43). In step S44, the coated porous metal substrate 120 and the metal frame 110 are combined as one by laser welding or brazing. The metal frame comprises ferritic stainless steel such as Crofer 22 or other metal materials with high temperature resistance for anti-oxidation and anti-corrosion.

Moreover, for a large-area porous metal substrate 120, the combination of the porous metal substrate 120 with the metal frame 110 will improve the resistance to deformation, flatness and mechanical strength of the cell at high temperatures (below 900° C.).

Referring to FIG. 4, the anode layer 130, the electrolyte layer 140, the cathode interlayer 150 and the cathode current collecting layer 160 can be formed by a medium current and high voltage tri-gas atmospheric plasma spray process disclosed in the present invention. It is noted that any of the foregoing layers can be formed by the tri-gas atmospheric plasma spray process. In the medium current and high voltage tri-gas atmospheric plasma spray process, the plasma flame heats up the injected powders more efficiently, and by adjusting the power of plasma spray gun and positions of powder injection, the porous layers with high mechanical strength and good ventilation and a gas-tight electrolyte layer with high mechanical strength can be formed. In one preferred embodiment of the present invention, all the foregoing layers are formed by the medium current and high voltage tri-gas atmospheric plasma spray process, to which the present invention is not limited.

The plasma flame by the medium current and high voltage tri-gas atmospheric plasma spray process in the present invention exhibits a longer plasma arc to lengthen the time for heating the powder clusters by the high-temperature plasma flame so that the powders are heated up more efficiently to be deposited to form a thin film with better quality. More particularly, the thin film as formed exhibits more tri-phase boundaries (TPB) and stronger mechanical strength. Moreover, the tri-gas atmospheric plasma spray process is performed in a medium current and high voltage environment. Since the working current is smaller, the electrode erosion of atmospheric plasma spray gun is reduced and the lifetime of the atmospheric plasma spray gun can be lengthened to reduce cost.

More particularly, the medium current and high voltage tri-gas atmospheric plasma spray process is a reliable high-voltage, high-enthalpy atmospheric plasma spray process using a mixture of argon, helium and hydrogen to produce an atmospheric plasma flame with high enthalpy. In the mixture of argon, helium and hydrogen of one present embodiment, the flow rate of argon is within a range from 49 to 55 slpm, the flow rate of helium is within a range from 20 to 30 slpm, and the flow rate of hydrogen is within a range from 2 to 10 slpm, but the present invention is not limited to the ranges of flow rates.

Moreover, the working voltage of the medium current and high voltage tri-gas atmospheric plasma spray process can be adjusted according to the material to be sprayed. When a dense layer such as the electrolyte 140 is to be sprayed, parameters for larger power and working voltage larger than 100±1 volt can be used. When a porous electrode layer such as the anode layer 130, the cathode interlayer 150 or cathode current collecting layer 160 is to be sprayed, parameters for smaller power and working voltage about 86±1 volt can be used. In other words, the reliable medium current, high voltage and high-enthalpy tri-gas atmospheric plasma spray process of the present invention is capable of adjusting spray parameters according to the practical need to form any of the layers of the solid oxide fuel cell 100 easily and rapidly. Anyone with ordinary skill in the art can make modifications on the embodiments within the scope of the present invention.

Similarly, the powder clusters are nano-structured micron powder clusters, which are formed by adding nano powders to a polyvinyl alcohol (PVA) binder and injecting the nano powder and the PVA binder together into a plasma flame to remove the binder and heat up the remained nano powders to be melted or semi-melted for film formation. These powder clusters are applied to form the anode layer 130 and the cathode interlayer 150 to be nano-structured.

As stated above, in the sub-micron structure or micron structured cathode current collecting layer 160, the powder clusters are formed by adding sub-micron powders or micron powders to a polyvinyl alcohol (PVA) binder. However, the present invention is not limited the material of powder clusters. For example, the powder clusters can be formed of a mixture of nano powders, sub-micron powders and micron powders added to a PVA binder. It depends on the structure of the layer. Moreover, even though the binder is formed of polyvinyl alcohol, the present invention is not limited thereto.

Figure 6C:
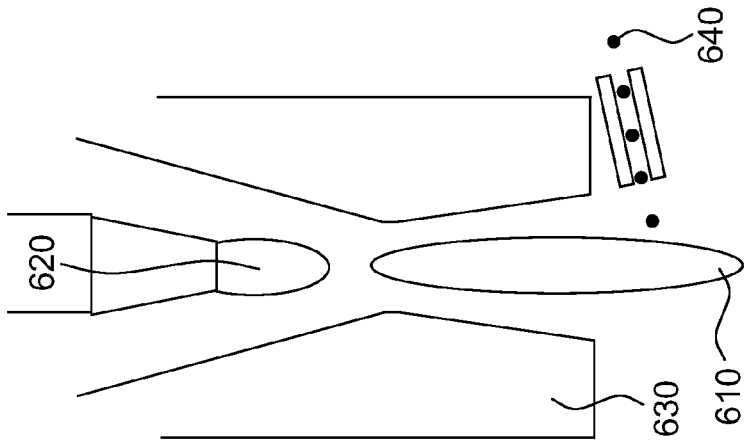
FIG. 6A to FIG. 6C are schematic diagrams of powder injection according to one embodiment of the present invention.
Figure 6B:
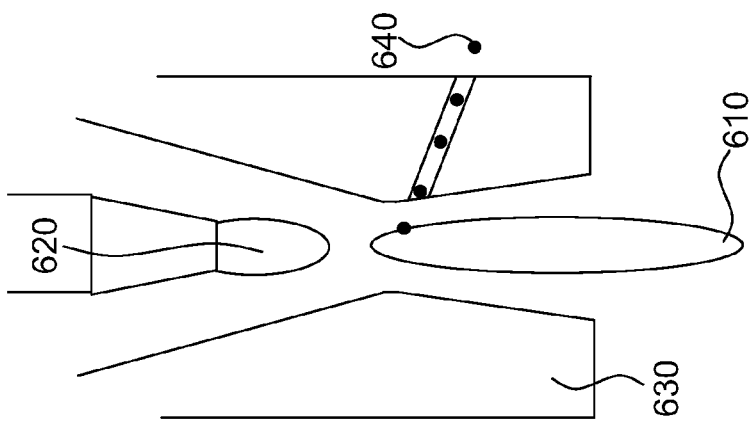
Figure 6A:
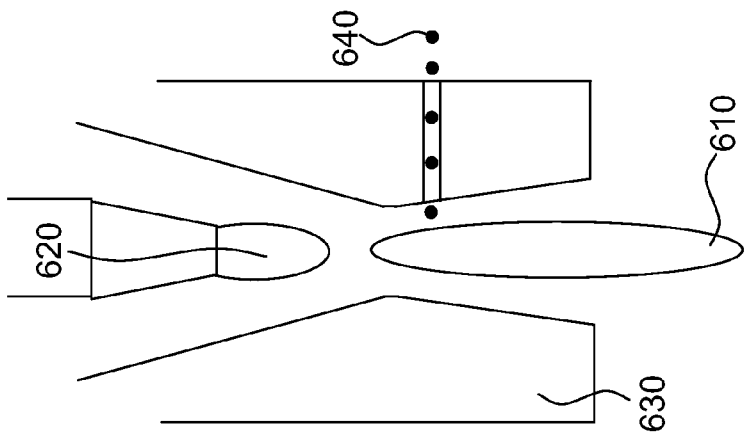

Moreover, the film characteristics vary with the ways the powder clusters are injected into the plasma flame. FIG. 6A to FIG. 6C are schematic diagrams of powder injection according to one embodiment of the present invention. Referring to FIG. 6A to 6C, the plasma flame 610 is generated from the cathode electrode 620 through the anode nozzle 630. The powder clusters 640 are injected into the plasma flame 610 to deposit thin films. In FIG. 6A, the powder clusters 640 are internally injected horizontally into the plasma flame 610. In FIG. 6B, the powder clusters 640 are internally injected upward into the plasma flame 610. In FIG. 6C, the powder clusters 640 are externally injected downward into the plasma flame 610. With these ways of powder injection, the powder clusters 640 are injected into the plasma flame 610 differently to obtain different film characteristics.

In the formation of the anode layer 130 in the present embodiment, the porous metal substrate 120 is heated up to 650 to 750° C. before coating the anode layer 130. The medium current and high voltage tri-gas atmospheric plasma spray process is performed to deposit the powder clusters on the porous metal substrate 120 to form the anode layer 130. The material, thickness and structure of the anode layer 130 have been described and thus are not presented herein.

Moreover, to make the anode layer 130 porous and increase the adhesion between the anode layer 130 and the porous metal substrate 120, the powder clusters are internally injected horizontally (in FIG. 6A) or internally injected downward (not shown) into the plasma flame. Moreover, to increase the porosity of the anode layer 130, carbon powders are added to the clusters to function as a pore-forming agent. In present embodiment, the weight percentage of carbon powders is smaller than 15 wt %, which will not affect the mechanical strength of the anode layer 130 too much.

In the formation of the electrolyte layer 140 and the isolation layer 170 in present embodiment, the porous metal substrate 120 and the anode layer 130 are heated up to 750 to 900° C. The medium current, high voltage tri-gas atmospheric plasma spray process is performed to deposit the powder clusters on the anode layer 130 to form the isolation layer 170 and the dense electrolyte layer 140 in order. Certainly, if the solid oxide fuel cell 100 is to operate below 700° C., the deposit of the isolation layer 170 can be omitted. The material, thickness and structure of the electrolyte layer 140 and the isolation layer 170 have been described and thus are not presented herein. Moreover, to make the powder clusters entirely melted or almost entirely melted, the powder clusters are internally injected upward into the plasma flame as in FIG. 6B.

In the formation of the porous cathode interlayer 150 and the porous cathode current collecting layer 160 in present embodiment, the porous metal substrate 120, the anode layer 130 and the electrolyte layer 140 are heated up to 650 to 750° C. The medium current, high voltage tri-gas atmospheric plasma spray process is performed to deposit the powder clusters on the electrolyte layer 140 to form the cathode interlayer 150 and the cathode current collecting layer 160 in order. The material, thickness and structure of the cathode interlayer 150 and the cathode current collecting layer 160 have been described and thus are not presented herein.

Moreover, in the formation of the cathode interlayer 150 and cathode current collecting layer 160, the powder clusters 640 can be externally injected downward into the plasma flame 610 as shown in FIG. 6C. Moreover, to increase the porosity of the cathode interlayer 150, carbon powders are added to the clusters to function as a pore-forming agent. In present embodiment, the weight percentage of carbon powders is smaller than 15 wt %, which will not affect the mechanical strength of the cathode interlayer 150 too much.

Referring to FIG. 4, a post treatment is performed after the anode layer 130, the electrolyte layer 140, the cathode interlayer 150 and the cathode current collecting layer 160 are formed in order so as to improve the performances of the solid oxide fuel cell 100.

In the present embodiment, the post treatment is a hot-pressing treatment at a temperature lower than 1000° C. so as to adjust the cathode resistance to a minimum value and achieve a maximum output power density of the solid oxide fuel cell 100. More particularly, the post treatment is a hot-pressing treatment at a temperature within a range from 875 to 950° C. under a pressure within a range from 200 g/cm$^2$ to 1 kg/cm$^2$. The hot-pressing treatment is to increase the cathode powder connection and is capable of reducing the cathode resistance so that the maximum output power density larger than 500 mW/cm$^2$ can be obtained.

Moreover, the objects of the hot-pressing treatment are to eliminate the stress in the layers formed by plasma spray and to increase the adhesion between these layers. The pressure and temperature of hot-pressing treatment need to be appropriate. The thermal treatment temperature is adjusted according to the plasma spray power for forming the cathode interlayer 150 and the cathode current collecting layer 160. With appropriate pressure and thermal treatment temperature, the contact areas between the powders in the cathode interlayer 150 and in the cathode current collecting layer 160 can be increased, so that the electron- and ion-conducting capability of the cathode interlayer 150 and the electron-conducting capability of the cathode current collecting layer 160 can be increased, while remaining the good ventilation abilities of the cathode interlayer 150 and the cathode current collecting layer 160.

Finally, as shown in FIG. 4, to improve the mechanical strength and flatness of the solid oxide fuel cell 100 for stacking, the porous metal substrate 120 and the metal frame 110 are combined together so as to complete the solid oxide fuel cell 100.

It is noted that, in the present invention, a protection layer (not shown) is formed on the metal frame 110 by the medium current and high voltage tri-gas atmospheric plasma spray process. The protection layer comprises, for example, manganese-cobalt or manganese-chromium spinel or lanthanum strontium-doped manganite (LSM).

The manufacturing parameters for the layers and measured characteristics of the solid oxide fuel cell 100 in the present invention are described hereinafter. It is noted that the presented results and characteristics are not presented to limit the present invention. Anyone with ordinary skill in the art can make modifications on the parameters within the scope of the present invention.

Example 1

The Porous Nanostructured Anode Layer Comprising a Graded Mixture (YSZ/Ni) of Nano Nickel and Nano Yttria-Stabilized Zirconia (YSZ)

There are two types of powder clusters injected into the plasma flame. One is micron powder clusters formed of nano yttria-stabilized zirconia (YSZ) powders and a polyvinyl alcohol (PVA) binder, while the other is micron powder clusters formed of nano nickel oxide (NiO) powders and a polyvinyl alcohol (PVA) binder. These two types of powder clusters are transmitted by a dual-hopper powder feeder (such as Sulzer Metco Twin-120) to a Y-hybrid powder mixer connected to a plasma spray gun. The powders are internally injected horizontally or internally injected downward.

Moreover, the plasma spray parameters include: the plasma gas flow rate: 49 to 55 slpm for argon, 20 to 30 slpm for helium, and 7 to 9 slpm for hydrogen; the working pressure for each kind of gas being within a range from 4 to 6 kg/cm$^2$; the spray power: 35 to 40 kw (current: 330 to 381 A, voltage: 105 to 106V); the spray distance: 9 to 11 cm; the scanning rate of the spray gun: 500 to 700 mm/sec; the powder feeding rate: 2 to 8 g/min; and pre-heating temperature of substrate for film deposition: 650 to 750° C.

The anode layer in present embodiment comprises nano yttria-stabilized zirconia (YSZ) (the anode ion-conducting nano-particles), nano nickel (Ni) (the anode electron-conducting nano-particles) and nano-pores (the anode nano-pores). The anode layer formed of a mixture (YSZ/Ni) of nano nickel and nano yttria-stabilized zirconia (YSZ) is obtained by reducing a mixture (YSZ/NiO) of nano nickel oxide and nano yttria-stabilized zirconia (YSZ) using hydrogen.

Moreover, the anode layer is gradedly coated and the ratio between nano yttria-stabilized zirconia (YSZ) and nano nickel (Ni) changes according to the gradedly volumetric ratio along a normal direction to the surface of the anode layer. In other words, the anode layer contains a higher percentage of nano nickel (Ni) as it gets closer to the porous metal substrate. Moreover, if the anode layer is not to be formed as gradedly structured, a layer of a mixture (YSZ/NiO) of nano yttria-stabilized zirconia (YSZ) and nano nickel (Ni) with 50%:50% volumetric ratio of YSZ:Ni is formed by spraying micron powder clusters comprise a mixture of nano yttria-stabilized zirconia (YSZ) powders, nano nickel oxide (NiO) powders and a polyvinyl alcohol (PVA) binder.

Example 2

The Porous Nanostructured Anode Layer Comprising a Graded Mixture (LDC/Ni) of Nano Nickel and Nano Lanthanum Doped Ceria (LDC)

There are two types of powder clusters injected into the plasma flame. One is micron powder clusters formed of nano lanthanum doped ceria (LDC) powders and a polyvinyl alcohol (PVA) binder, while the other is micron powder clusters formed of nano nickel oxide (NiO) powders and a polyvinyl alcohol (PVA) binder. These two types of powder clusters are transmitted by a dual-hopper powder feeder (such as Sulzer Metco Twin-120) to a Y-hybrid powder mixer connected to a plasma spray gun. The powders are internally injected horizontally or internally injected downward.

Moreover, the plasma spray parameters include: the plasma gas flow rate: 49 to 55 slpm for argon, 20 to 30 slpm for helium, and 7 to 9 slpm for hydrogen; the working pressure for each kind of gas being within a range from 4 to 6 kg/cm$^2$; the spray power: 35 to 40 kw (current: 330 to 381 A, voltage: 105 to 106V); the spray distance: 9 to 11 cm; the scanning rate of the spray gun: 500 to 700 mm/sec; the powder feeding rate: 2 to 8 g/min; and pre-heating temperature of substrate for film deposition: 650 to 750° C.

The anode layer in present embodiment comprises nano lanthanum doped ceria (LDC) (i.e., the anode ion-conducting nano-particles), nano nickel (Ni) (i.e., the anode electron-conducting nano-particles) and nano-pores (i.e., the anode nano-pores). The anode layer formed of a mixture (LDC/Ni) of nano nickel and nano lanthanum doped ceria (LDC) is obtained by reducing a mixture (LDC/NiO) of nano nickel oxide and nano lanthanum doped ceria (LDC) using hydrogen.

Moreover, the anode layer can be gradedly coated and the ratio between nano lanthanum doped ceria (LDC) and nano nickel (Ni) changes according to the gradedly volumetric ratio along a normal direction to the surface of this anode layer. In other words, the anode layer contains a higher percentage of nano nickel (Ni) as it gets closer to the porous metal substrate. Moreover, if the anode layer is not to be formed as gradedly structured, a layer of a mixture (LDC/NiO) of nano lanthanum doped ceria (LDC) and nano nickel (Ni) with 50%:50% volumetric ratio of LDC:Ni is formed by spraying micron powder clusters comprise a mixture of nano lanthanum doped ceria (LDC) powders, nano nickel oxide (NiO) powders and a polyvinyl alcohol (PVA) binder.

Example 3

The Dense Isolation Layer Comprising Nano Lanthanum Doped Ceria (LDC)

The powder clusters injected into the plasma flame are micron powder clusters formed of nano lanthanum doped ceria (LDC) powders and a polyvinyl alcohol (PVA) binder. The powders are internally injected upward or horizontally. The plasma spray parameters include: the plasma gas flow rate: 49 to 55 slpm for argon, 20 to 30 slpm for helium, and 7 to 9 slpm for hydrogen; the working pressure for each kind of gas being within a range from 4 to 6 $kg/cm^2$; the spray power: 44 to 48 kw (current: 420 to 462 A, voltage: 104 to 105V); the spray distance: 8 to 10 cm; the scanning rate of the spray gun: 800 to 1200 mm/sec; the powder feeding rate: 2 to 6 g/min; and pre-heating temperature of substrate for film deposition: 750 to 850° C.

Lanthanum strontium gallate magnesite (LSGM) is for the electrolyte layer, dense lanthanum doped ceria (LDC) is for the isolation layer, and a mixture (LDC/Ni) of nano nickel and nano lanthanum doped ceria (LDC) is for the anode layer.

The middle layer is an isolation layer comprising lanthanum doped ceria (LDC) coated on the anode layer comprising a mixture (LDC/Ni) of nano nickel and nano lanthanum doped ceria (LDC). The isolation layer comprising lanthanum doped ceria (LDC) is very dense with only a few small pores.

Example 4

The Gas-Tight Electrolyte Layer Comprising Lanthanum Strontium Gallate Magnesite (LSGM)

The powder clusters injected into the plasma flame are micron powder clusters formed of nano lanthanum strontium gallate magnesite (LSGM) powders and a polyvinyl alcohol (PVA) binder, or micron powder clusters formed of sub-micron to micron lanthanum strontium gallate magnesite (LSGM) powders sintered together or mixed with a PVA binder, or micron powder clusters of nano lanthanum strontium gallate magnesite (LSGM) powders sintered together. The powders are internally injected upward. The plasma spray parameters include: the plasma gas flow rate: 49 to 55 slpm for argon, 20 to 30 slpm for helium, and 6 to 10 slpm for hydrogen; the working pressure for each kind of gas being within a range from 4 to 6 $kg/cm^2$; the spray power: 46 to 52 kw (current: 442 to 505 A, voltage: 103 to 104V); the spray distance: 8 to 10 cm; the scanning rate of the spray gun: 500 to 700 mm/sec; the powder feeding rate: 2 to 6 g/min; and pre-heating temperature of substrate for LSGM film deposition: 750 to 850° C.

The electrolyte layer comprising lanthanum strontium gallate magnesite (LSGM) produced by the medium current and high voltage tri-gas atmospheric plasma spray process is very dense and gas-tight with only a few small pores.

Example 5

The Porous Nanostructured Cathode Interlayer Comprising a Graded Mixture (LSGM/LSCF) of Lanthanum Strontium Gallate Magnesite and Lanthanum Strontium Cobalt Ferrite There are two types of powder clusters injected into the plasma flame. One is micron powder clusters formed of nano lanthanum strontium gallate magnesite (LSGM) powders and a polyvinyl alcohol (PVA) binder, while the other is micron powder clusters formed of sub-micron lanthanum strontium cobalt ferrite (LSCF) powders and a polyvinyl alcohol (PVA) binder. These two types of powder clusters are transmitted by a dual-hopper powder feeder (such as Sulzer Metco Twin-120) to a Y-hybrid powder mixer connected to a plasma spray gun. The powders are externally injected horizontally or downward.

Moreover, the plasma spray parameters include: the plasma gas flow rate: 49 to 55 slpm for argon, 20 to 30 slpm for helium, and 2 to 5 slpm for hydrogen; the working pressure for each kind of gas being within a range from 4 to 6 $kg/cm^2$; the spray power: 27 to 32 kw (current: 300 to 352 A, voltage: 90 to 91V); the spray distance: 9 to 11 cm; the scanning rate of the spray gun: 500 to 700 mm/sec; the powder feeding rate: 2 to 8 g/min; and pre-heating temperature of substrate for film deposition: 650 to 750° C.

The cathode interlayer in present embodiment comprises nano lanthanum strontium gallate magnesite (LSGM) (i.e., the cathode ion-conducting nano-particles), nano-pores (i.e., the cathode nano-pores), and sub-micron lanthanum strontium cobalt ferrite (LSCF) (i.e., the cathode electron-conducting nano-particles).

Moreover, the cathode interlayer can be gradedly coated and the ratio between nano lanthanum strontium gallate magnesite (LSGM) and sub-micron lanthanum strontium cobalt ferrite (LSCF) changes according to the gradedly volumetric ratio along a normal direction to the surface of this cathode interlayer. In other words, the cathode interlayer contains a higher percentage of LSGM as it gets closer to the electrolyte layer. Moreover, the afore-mentioned nano lanthanum strontium gallate magnesite (LSGM) powders can be replaced by sub-micron lanthanum strontium gallate magnesite (LSGM) powders and then mixed with a polyvinyl alcohol (PVA) binder to form micron powder clusters. Moreover, if the cathode interlayer is not to be formed as gradedly structured, a layer of a mixture (LSGM/LSCF) of lanthanum strontium gallate magnesite (LSGM) and lanthanum strontium cobalt ferrite (LSCF) with 50%:50% volumetric ratio of LSGM:LSCF is formed by spraying micron powder clusters formed of nano or sub-micron lanthanum strontium gallate magnesite (LSGM) powders, sub-micron lanthanum strontium cobalt ferrite (LSCF) powders and a polyvinyl alcohol (PVA) binder.

Example 6

The Porous Sub-Micron or Micron Structured Cathode Current Collecting Layer Comprising Lanthanum Strontium Cobalt Ferrite (LSCF)

The powder clusters injected into the plasma flame are micron powder clusters formed of sub-micron or micron lanthanum strontium cobalt ferrite (LSCF) powders and a polyvinyl alcohol (PVA) binder. The powders are externally injected downward. The plasma spray parameters include: the plasma gas flow rate: 49 to 55 slpm for argon, 20 to 30 slpm for helium, and 2 to 5 slpm for hydrogen; the working pressure for each kind of gas being within a range from 4 to 6 $kg/cm^2$; the spray power: 27 to 32 kw (current: 300 to 352 A, voltage: 90 to 91V); the spray distance: 9 to 11 cm; the scanning rate of the spray gun: 500 to 700 mm/sec; the powder feeding rate: 2 to 8 g/min; and pre-heating temperature of substrate for film deposition: 650 to 750° C.

The cathode current collecting layer in present embodiment comprises sub-micron lanthanum strontium cobalt ferrite (LSCF) and pores.

Example 7

The LDC/Ni-LDC-LSGM-LSGM/LSCF-LSCF Solid Oxide Fuel Cell

According to the spray parameters in the afore-mentioned Examples 2 to 6, the porous nano-structured anode layer formed of a mixture (LDC/Ni) of nano nickel and nano lanthanum doped ceria (LDC), the isolation layer comprising dense lanthanum doped ceria (LDC), the electrolyte layer comprising dense lanthanum strontium gallate magnesite (LSGM), the porous nano-structured cathode interlayer formed of a mixture (LSGM/LSCF) of nano lanthanum strontium gallate magnesite (LSGM) and sub-micron lanthanum strontium cobalt ferrite mixture (LSCF), and the cathode current collecting layer comprising submicron or micron lanthanum strontium cobalt ferrite (LSCF) are formed in order on the porous metal substrate to complete manufacturing a LDC/Ni-LDC-LSGM-LSGM/LSCF-LSCF solid oxide fuel cell. Then, the solid oxide fuel cell is hot-pressed at a temperature within a range from 875 to 950° C. for 1 to 3 hours to achieve better electric characteristics of cell.

Figure 7:
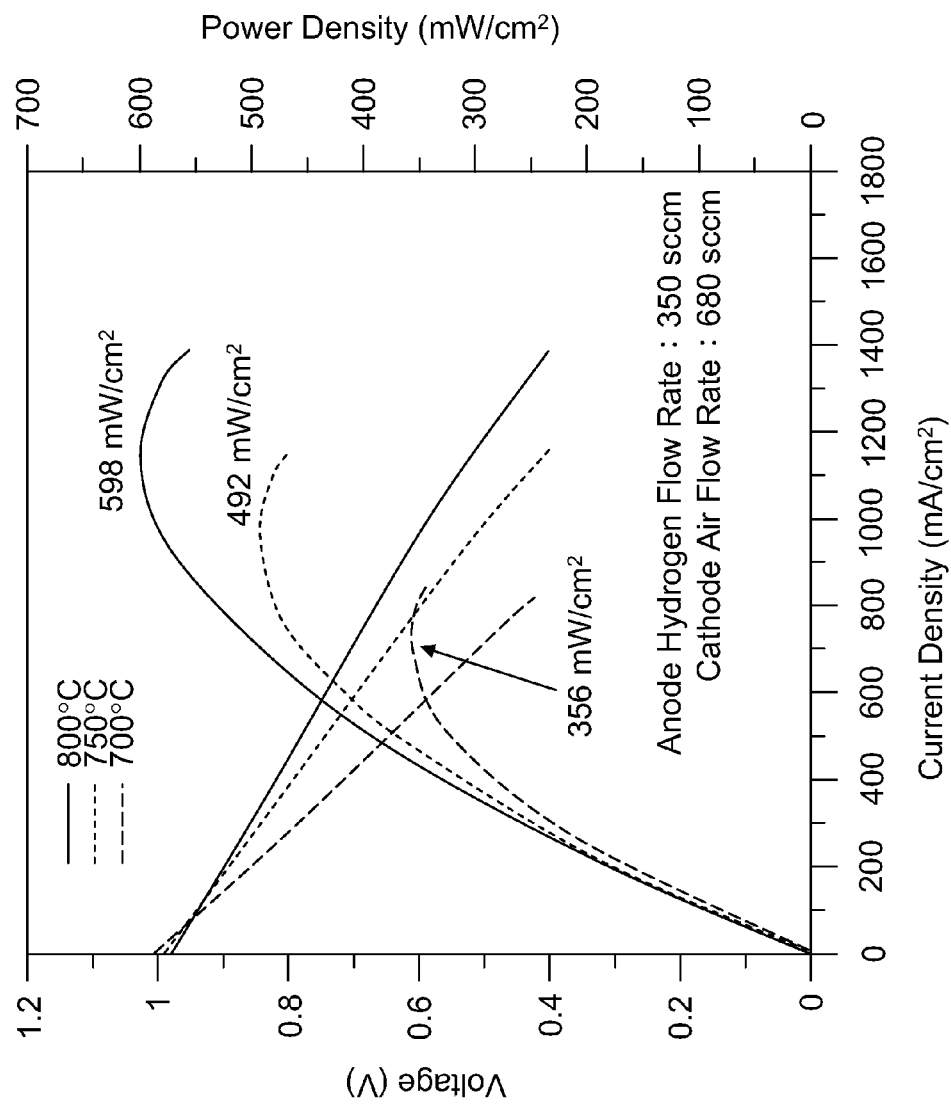
FIG. 7 shows the electric characteristics of a solid oxide fuel cell according to one embodiment of the present invention.

FIG. 7 shows the electric characteristics of a solid oxide fuel cell according to one embodiment of the present invention. The solid oxide fuel cell exhibits a maximum output power density of 356 $mw/cm^2$, 492 $mw/cm^2$ and 598 $mw/cm^2$ at a working temperature of 700° C., 750° C. and 800° C., respectively. Moreover, the solid oxide fuel cell in the present embodiment exhibits reliable performances even when it is tested for a long period of time.

Example 8

The YSZ/Ni-LSGM-LSCF Solid Oxide Fuel Cell

According to the spray parameters in the afore-mentioned Examples 1, 4 and 6, the nano-structured anode layer formed of a mixture (YSZ/Ni) of nano nickel and nano yttria-stabilized zirconia (YSZ), the electrolyte layer comprising lanthanum strontium gallate magnesite (LSGM) and the cathode current collecting layer comprising sub-micron structured lanthanum strontium cobalt ferrite (LSCF) are formed in order on the porous metal substrate to complete manufacturing a YSZ/Ni-LSGM-LSCF solid oxide fuel cell. Then, the solid oxide fuel cell is hot-pressed at a temperature within a range from 875 to 950° C. for 1 to 3 hours to achieve better electric characteristics.

Figure 8:
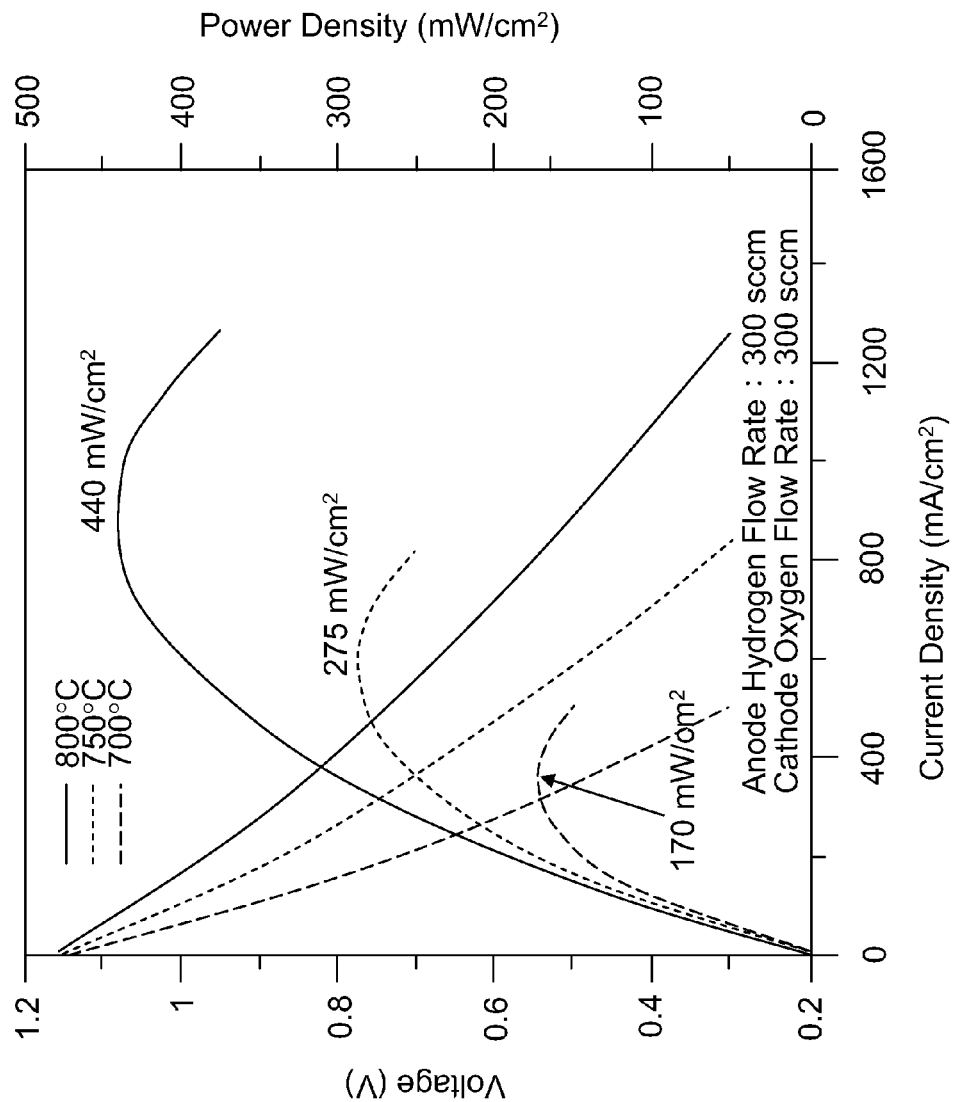
FIG. 8 shows the electric characteristics of a solid oxide fuel cell according to another embodiment of the present invention.

FIG. 8 shows the electric characteristics of a solid oxide fuel cell according to another embodiment of the present invention. The solid oxide fuel cell exhibits a maximum output power density of 170 $mw/cm^2$, 275 $mw/cm^2$ and 440 $mw/cm^2$ at a working temperature of 700° C., 750° C. and 800° C., respectively.

In the present embodiment, the cathode current collecting layer comprising sub-micron structured lanthanum strontium cobalt ferrite (LSCF) are used as a cathode interlayer and a current collecting layer so that the cathode interlayer 150 is not required and the cost is lowered. Moreover, it is noted that, in the afore-mentioned manufacturing method, the porous metal substrate is also used as an anode current collecting layer, and the anode layer, the electrolyte layer and the cathode current collecting layer are formed in order on the porous metal substrate.

As stated above, the solid oxide fuel cell and the manufacturing method thereof according to the present invention at least comprise advantages of:

1. The nano-structured anode layer and the nano-structured cathode interlayer provide a plurality of nano tri-phase boundaries (TPB) to improve the cell electric characteristics while lowering the working temperature of a solid oxide fuel cell.

2. In the present invention, powder clusters formed by adding a binder into powders are injected into a plasma flame to burn out the binder and melt the remaining powders that are deposited as a thin film to achieve better uniformity and film quality.

3. In the present invention, the powders are injected in various ways to control the film characteristics (such as porosity, density or gas-tightness).

4. The metal frame and the porous metal substrate are combined to improve the mechanical strength and flatness of the cell for formation of a cell stack.

5. The medium current and high voltage tri-gas atmospheric plasma spray process provides a plasma flame with longer plasma arc to lengthen the time for heating the powders.

6. The medium current and high voltage tri-gas atmospheric plasma spray process reduces the erosion of spray gun electrodes and lengthens the lifetime of the gun electrodes and thus lowers the manufacturing cost.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A manufacturing method of a solid oxide fuel cell, comprising steps of:
performing a preliminary treatment on a porous metal substrate to reduce the sizes of surface pores of the porous metal substrate;
forming an anode layer, an electrolyte layer, a cathode interlayer and a cathode current collecting layer in order on the preheated porous metal substrate by tri-gas atmospheric plasma spray processes with medium currents under 520A and high voltages of 86 to 106V after the preliminary treatment;
treating the plasma sprayed cell by a post treatment; and
combining the porous metal substrate with a metal frame;

wherein the anode layer, the cathode layer, and the cathode current collecting layer are all porous;

wherein the anode layer is nano structured, the cathode interlayer is nanostructured or sub-micron structured, and the cathode current collecting layer is sub-micron or micron structured;

wherein the electrolyte layer is dense;

wherein the metal frame has a protection layer.

2. The manufacturing method of a solid oxide fuel cell as recited in claim 1, the post treatment is to improve the performances and reliability of the solid oxide fuel cell after the cathode current collecting layer is formed.

3. The manufacturing method of a solid oxide fuel cell as recited in claim 1, the porous metal substrate is disposed inside the metal frame and the laser welding or brasing is applied to combine the porous metal substrate and the metal frame.

4. The manufacturing method of a solid oxide fuel cell as recited in claim 2, wherein the post treatment is a hot-pressing treatment at a temperature within a range from 875 to 950° C. and at a pressure within a range from 200 g/cm$^2$ to 1 kg/cm$^2$ for 1 to 3 hours.

5. The manufacturing method of a solid oxide fuel cell as recited in claim 1, wherein the step of performing the preliminary treatment on the porous metal substrate comprises steps of:

providing the porous metal substrate;

performing a flattening process on the porous metal substrate;

performing a surface powder pasting process on the porous metal substrate;

performing a high temperature and high pressure sintering process on the porous metal substrate with surface powders in a reducing atmosphere to form a thin porous layer on the porous metal substrate;

performing a surface oxidation process for the porous metal substrate with the thin porous layer in an atmospheric environment to reduce the pore sizes of the thin porous layer.

6. The manufacturing method of a solid oxide fuel cell as recited in claim 5, wherein the surface powdering process is to coat the porous metal substrate with metal powders, anode powder slurry or a mixture of metal and anode powder slurry to form the thin porous layer on the porous metal substrate so that the sizes of surface pores of the porous metal substrate with the thin porous layer are less than 50 μm, anode poison elements such as chromium in the metal powders and anode powder slurry being as small as possible.

7. The manufacturing method of a solid oxide fuel cell as recited in claim 5, wherein the high-temperature and high-pressure sintering process is to perform sintering at a temperature within a range between from 1100 to 1300° C. in a reducing atmosphere and with a high pressure between 5 kg/cm$^2$ to 50 kg/cm$^2$.

8. The manufacturing method of a solid oxide fuel cell as recited in claim 5, the surface oxidation process on the porous metal substrate with the thin porous layer is to reduce the pore sizes of the thin porous layer further to be less than 30 μm.

9. The manufacturing method of a solid oxide fuel cell as recited in claim 8, wherein the surface oxidation process is to perform surface oxidation of the thin porous layer on the porous metal substrate at a temperature within a range from 700 to 800° C. for 15 to 45 minutes.

10. The manufacturing method of a solid oxide fuel cell as recited in claim 1, wherein tri-gas atmospheric plasma spray processes with medium current under 520A and high voltages of 86-106V are performed by providing a mixture of argon, helium and hydrogen.

11. The manufacturing method of a solid oxide fuel cell as recited in claim 10, wherein the flow rate of argon is within a range from 49 to 55 slpm, the flow rate of helium is within a range from 20 to 30 slpm, and the flow rate of hydrogen is within a range from 2 to 10 slpm.

12. The manufacturing method of a solid oxide fuel cell as recited in claim 1, wherein the anode layer is formed by the medium current under 520A_and the 86-106V_high voltage tri-gas atmospheric plasma spray process with internal horizontal powder injection or internal downward powder injection.

13. The manufacturing method of a solid oxide fuel cell as recited in claim 1, further comprising a step of forming an dense isolation layer on the preheated anode layer after forming the anode layer, wherein the dense isolation layer is formed by the tri-gas atmospheric plasma spray process and the substrate preheated temperature ranges from 750 to 850° C.

14. The manufacturing method of a solid oxide fuel cell as recited in claim 13, wherein the isolation layer is formed by the medium current and high voltage tri-gas atmospheric plasma spray process with internal upward powder injection.

15. The manufacturing method of a solid oxide fuel cell as recited in claim 1, wherein the electrolyte layer is formed by the medium current and high voltage tri-gas atmospheric plasma spray process with internal upward powder injection.

16. The manufacturing method of a solid oxide fuel cell as recited in claim 1, wherein the cathode interlayer is formed by the medium current under 520A and the 86-106V high voltage tri-gas atmospheric plasma spray process with external downward powder injection.

17. The manufacturing method of a solid oxide fuel cell as recited in claim 1, wherein the cathode current collecting layer is formed by the medium current under 520A and the 86-106V high voltage tri-gas atmospheric plasma spray process with external downward powder injection.

18. The manufacturing method of a solid oxide fuel cell as recited in claim 3, further comprising a step of filling a groove with a sealent after combining the porous metal substrate and the metal frame, the groove being the position used to combine the porous metal substrate with the metal frame.

19. The manufacturing method of a solid oxide fuel cell as recited in claim 1, wherein the porous metal substrate is formed of metal powders comprising undoped nickel powders, nickel powders doped with iron powders, copper powders doped with iron powders or copper powders and nickel powders doped with iron powders, the weight percentage of the iron powders is less than 20% and the anode poison elements such as chromium in the porous metal substrate spray is as small as possible.

20. The manufacturing method of a solid oxide fuel cell as recited in claim 1, wherein the porous nanostructured anode layer before hydrogen reduction is formed by two types of powder clusters, one is micron powder clusters formed of ion-conducting nano powders and a polyvinyl alcohol (PVA) binder, while the other is micron powder clusters formed of nano metal oxide powders and a PVA binder, and these two types of powder clusters are transmitted by powder feeders to a plasma spray gun.

21. The manufacturing method of a solid oxide fuel cell as recited in claim 20, wherein the micron powder clusters for forming the porous nanostructured anode layer are internally injected horizontally or internally injected downward to a plasma spray gun.

22. The manufacturing method of a solid oxide fuel cell as recited in claim 20, wherein ion conducting nano powders comprise nano yttria-stabilized zirconia (YSZ), nano lanthanum doped ceria (LDC) or nano gadolinium doped ceria (GDC); nano metal oxide powders is reduced to nano metals comprising nano nickel, nano copper, nano nickel-copper or nano nickel-copper-cobalt by hydrogen.

23. The manufacturing method of a solid oxide fuel cell as recited in claim 1, wherein the dense electrolyte is formed by micron powder clusters formed of nano electrolyte powders and a polyvinyl alcohol (PVA) binder, or micron powder clusters formed of submicron to micron electrolyte powders and a PVA binder, and these powder clusters are transmitted by a powder feeder to a plasma spray gun.

24. The manufacturing method of a solid oxide fuel cell as recited in claim 23, wherein the micron powder clusters for forming the dense electrolyte layer are internally injected upward to a plasma spray gun.

25. The manufacturing method of a solid oxide fuel cell as recited in claim 23, wherein the electrolyte powders comprise lanthanum strontium gallate magnesite (LSGM), gadolinium doped ceria (GDC) or lanthanum doped ceria (LDC).

26. The manufacturing method of a solid oxide fuel cell as recited in claim 1, wherein the porous nanoatructured cathode interlayer is formed by two types of powder clusters, one is micron powder clusters formed of cathode ion-conducting nano powders and a polyvinyl alcohol (PVA) binder, while the other is micron powder clusters formed of cathode electron-conducting powders and a PVA binder, and these two types of powder clusters are transmitted by powder feeders to a plasma spray gun.

27. The manufacturing method of a solid oxide fuel cell as recited in claim 26, wherein the micron powder clusters for forming the cathode interlayer layer are externally injected downward to a plasma spray gun.

28. The manufacturing method of a solid oxide fuel cell as recited in claim 26, wherein the cathode ion-conducting nano powders comprise nano lanthanum strontium gallate magnesite (LSGM), nano gadolinium doped ceria (GDC) or nano lanthanum doped ceria (LDC); cathode electron-conducting powders comprise lanthanum strontium cobalt ferrite (LSCF), lanthanum strontium ferrite (LSF), lanthanum strontium cobalt (LSCo) or samarium strontium cobalt (SSC) oxides.

29. The manufacturing method of a solid oxide fuel cell as recited in claim 1, wherein the porous sub-micron or micron structured cathode current collecting layer is formed by micron powder clusters composed of a polyvinyl alcohol binder and sub-micron or micron powders conducting both electron and oxygen ion, and these powder clusters are transmitted by a powder feeder to a plasma spray gun.

30. The manufacturing method of a solid oxide fuel cell as recited in claim 29, wherein the micron powder clusters for forming the cathode current collecting layer are externally injected downward to a plasma spray gun.

31. The manufacturing method of a solid oxide fuel cell as recited in claim 29, wherein the sub-micron or micron powders conducting both electron and oxygen ion comprise lanthanum strontium cobalt ferrite (LSCF), lanthanum strontium ferrite (LSF), lanthanum strontium cobalt (LSCo) or samarium strontium cobalt (SSC) oxides.

32. The manufacturing method of a solid oxide fuel cell as recited in claim 1, wherein the porous metal substrate is preheated at different temperatures for fabricating the solid oxide fuel cell, the preheated temperature ranges from 650 to 750° C. for fabricating the anode layer, the cathode interlayer and the cathode current collecting layer, the preheated temperature ranges from 750 to 850° C. for fabricating the dense gas-tight electrolyte layer.

33. The manufacturing method of a solid oxide fuel cell as recited in claim 1, wherein the metal frame comprises ferritic stainless steels or other metal materials with high temperature resistance for anti-oxidation and anti-corrosion.

34. The manufacturing method of a solid oxide fuel cell as recited in claim 1, wherein the protection layer comprises a lanthanum strontium-doped manganite (LSM) or a manganese-cobalt spinel or a manganese-chromium spinel protection layer protection layer.

35. The manufacturing method of a solid oxide fuel cell as recited in claim 13, wherein the dense isolation layer is formed by micron powder clusters formed of nano lanthanum doped ceria (LDC) powders and a polyvinyl alcohol binder, and these powder clusters are transmitted by a powder feeder to a plasma spray gun.

36. The manufacturing method of a solid oxide fuel cell as recited in claim 35, wherein the nano lanthanum doped ceria (LDC) powder clusters are internally injected upward or horizontally to a plasma spray gun.

37. The manufacturing method of a solid oxide fuel cell as recited in claim 1, wherein to produce cathode interlayer and cathode current collecting layer the carbon powders are used as a pore-forming agent and the weight percentage of carbon powders is smaller than 15 wt %.

* * * * *